Nov. 30, 1943.    J. T. ATWOOD ET AL    2,335,254
MOTOR VEHICLE SEAT SLIDE
Filed Sept. 3, 1940    2 Sheets-Sheet 2
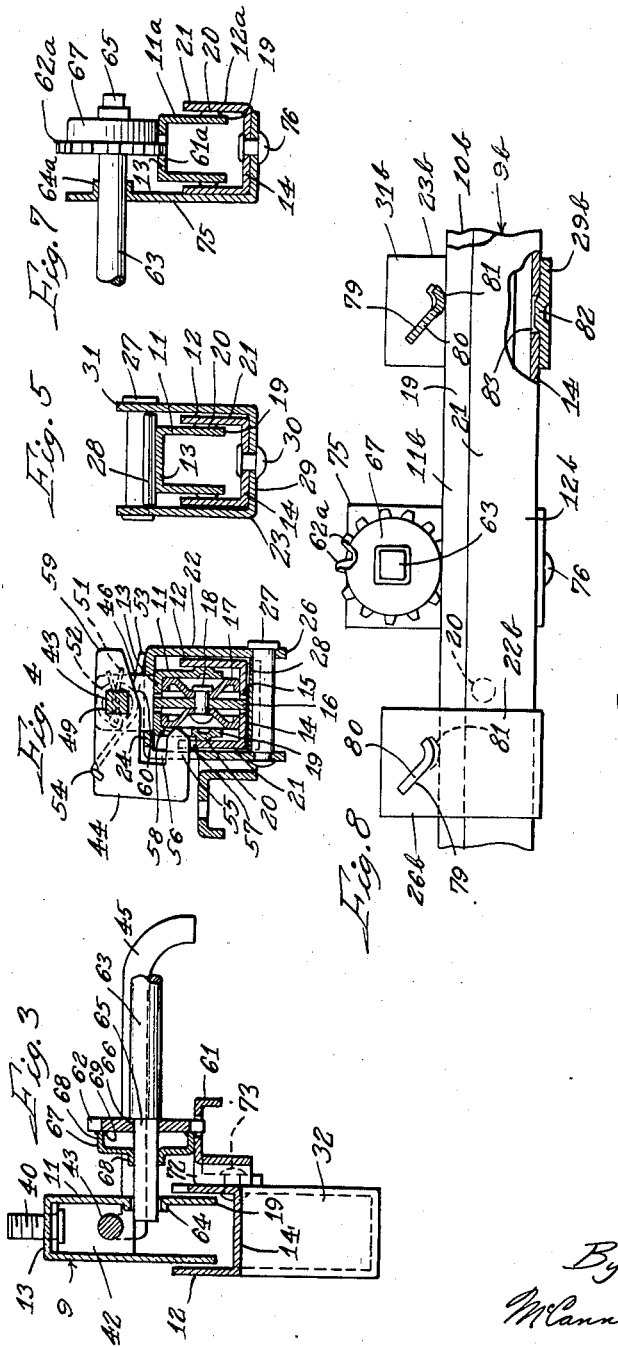
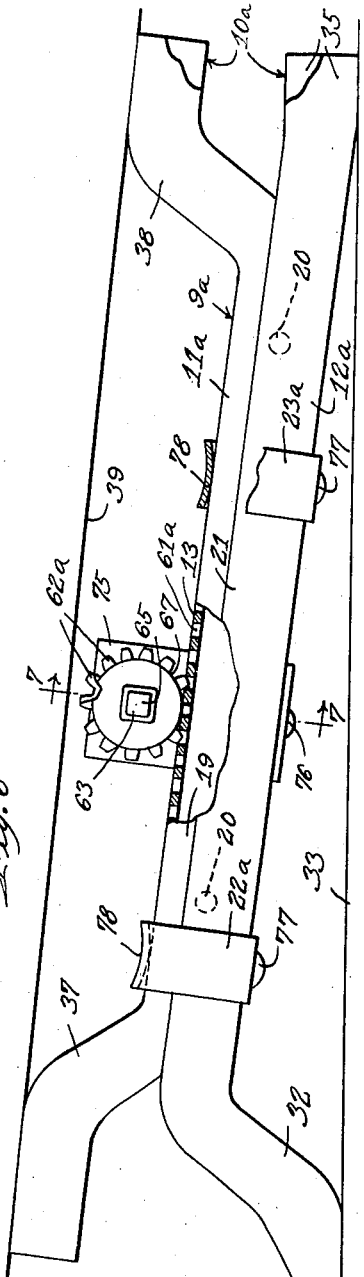

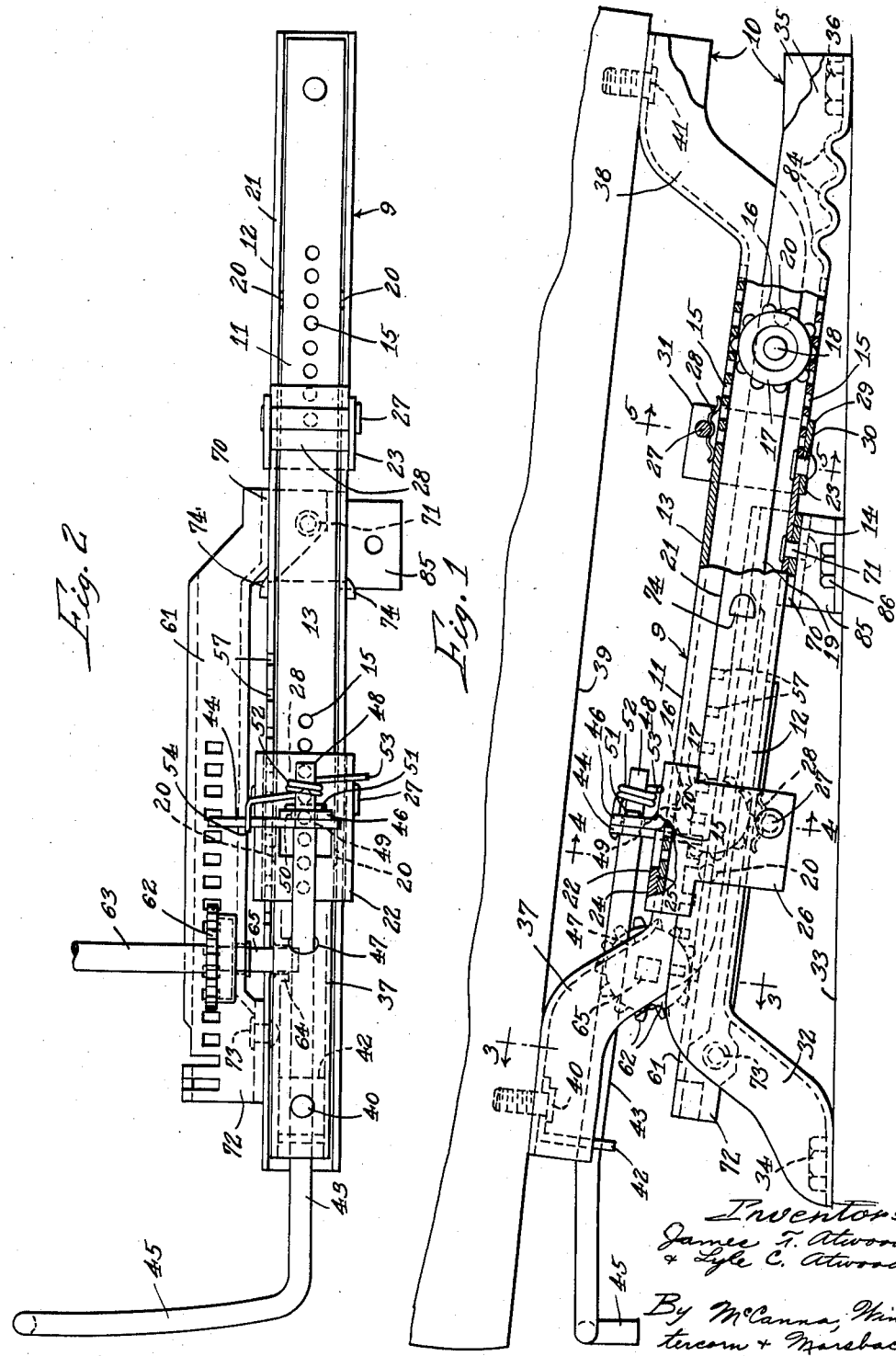

Patented Nov. 30, 1943

2,335,254

UNITED STATES PATENT OFFICE 2,335,254

MOTOR VEHICLE SEAT SLIDE

James T. Atwood and Lyle C. Atwood, Rockford, Ill., assignors to The Atwood Vacuum Machine Company, Rockford, Ill., a copartnership composed of Seth B. Atwood and James T. Atwood Application September 3, 1940, Serial No. 355,178

15 Claims. (Cl. 155—14)

This invention relates to a new and improved seat slide for motor vehicles.

The principal object of our invention is to provide a seat slide of light, strong, and economical sheet metal construction, and one which while constructed to be substantially free from objectionable rattles is nevertheless adjustable back and forth with comparative ease.

A salient feature of the seat slide is the provision of two channels which interfit with their open sides toward each other so as to permit the location of toothed spacing rollers therebetween, rolling on the webs of the channels with the teeth engaging in spaced holes punched in the webs, the one channel having bent-up ends to fasten to the seat bottom and the other having a bent down front end to fasten to the floor, the webs of both channels being used in fastening the same to the seat bottom and floor respectively, and the shape of the channel members being of advantage in that there is ample room left under the seat for the battery box and to permit free circulation of air under the seat, as required for good rear heating circulation.

Other features of the present seat slide are:

(1) The provision of holding means consisting of U-shaped yokes straddling the channel members, each secured to one of the channel members to move therewith and having means between the arms thereof engaging the outside of the web of the other channel member, resiliently or otherwise, to hold the channels in assembled relationship to the rollers, while at the same time taking care of minor variations in the channel members so that there will be no likelihood of the slide working hard or binding;

(2) The provision of outwardly embossed portions on the flanges of the inner channel member at spaced points for sliding engagement with the flanges of the outer channel member so that the slide will operate with reduced friction and without rattling;

(3) The provision of stops struck out from the flanges on the outer channel member arranged to engage the forward yoke on the inner channel member straddling the outer channel member, whereby to limit rearward movement of the seat with the inner channel member;

(4) The provision of a rotary latch bolt arranged to be turned relative to the forward yoke on the inner channel member to engage in notches in the flange on one side of the outer channel, the latch being arranged to project through registering openings in the yoke and the flange on one side of the inner channel member when engaged in any one of the notches in the flange in the outer channel member, so that the seat is locked securely and the latch is relieved of strains tending to bend the same; and (5) The provision in connection with the rotary latch of a manually rotatable operating rod extending lengthwise relative to the front end portion of the inner channel member and through an opening in the web thereof for support of the rod on a bracket projecting downwardly from the web of the channel at its forward extremity and support at its rear end in a lug struck up from the forward yoke straddling the inner channel member.

These and other features of the invention will appear in the course of the following detailed description, in which—

Figure 1 is a side view of a seat slide structure made in accordance with our invention, a portion of the structure being shown in section for purposes of better illustration;

Fig. 2 is a plan view of the structure of Fig. 1;

Figs. 3, 4, and 5 are sectional details on the correspondingly numbered lines of Fig. 1, looking in the directions indicated by the arrows;

Fig. 6 is a side view of another seat slide structure similar to Fig. 1 but showing a modified or alternative construction;

Fig. 7 is a sectional detail on the line 7—7 of Fig. 6, and

Fig. 8 is a fragmentary side elevational view along the lines of Fig. 6 showing still another construction.

Similar reference numerals are applied to corresponding parts throughout the views.

Referring first mainly to Figs. 1 and 2, the reference numeral 9 designates generally one of two seat slide structures disposed in substantially parallel relation to one another, its companion seat slide structure being indicated generally at 10. Each structure comprises two interfitting sheet metal channel members 11 and 12, the former fitting within the latter with their open sides toward each other so that the web portion 13 of the inner channel is uppermost and the web portion 14 of the outer channel is lowermost. Rack holes 15 are provided in the webs 13 and 14 in longitudinally spaced relation for latching engagement with the gears or gear rollers, each made up of a gear 16 meshing with the rack holes 15, and opposed stamped sheet metal washers 17 riveted thereto as at 18 and arranged to roll on the inner side of the webs 13 and 14 to provide anti-friction rolling support for the inner channel 11 in the outer channel 12, while at the same time insuring that the gear rollers will always remain a fixed distance apart. The gear rollers have a close working fit inside the channel 11, as indicated in Fig. 4 where the washers 17 are shown in sliding contact with the flanges 19 of the channel 11. These flanges have outwardly struck circular bosses 20 slidably engaging the flanges 21 of the channel 12, as also clearly appears in Fig. 4, so that the flanges 19 and 21 are uniformly laterally spaced and have contact only at longitudinally spaced points, there being preferably only two bosses 20 provided on each of the flanges 19 near the opposite ends of the channel 11, as indicated in Fig. 2. This insures easy sliding of the inner channel 11 of each of the seat slide structures 9 and 10 relative to the outer channel 12, while at the same time eliminating rattling which would otherwise result if the channels were spaced as herein disclosed but had no small bosses provided thereon to provide the sliding engagement. With the construction thus far described, it is also clear that the gear rollers are fairly well enclosed within the channels 11 and 12 and are, therefore, protected from dirt and grit and may, if desired, be coated with graphite or other similar lubricant at the time of original assembling, such lubrication being usually sufficient for the life of the unit.

Two U-shaped sheet metal yoke members or brackets 22 and 23 are provided on each of the seat slide structures 9 and 10 near the opposite ends thereof to secure the inner and outer channels 11 and 12 in assembled relationship to the gear rollers and preferably hold the channels with their web portions under light spring tension toward engagement with the gear rollers, whereby further to eliminate play and consequent rattling, while at the same time compensating for such minor variations in the construction of the channels as are bound to occur, especially in quantity production. Then, too, the resilient tie-up of the channel members while maintaining close assembled relationship affords enough give so that there will be no tendency for the parts to bind or sieze and the seat slide structures 9 and 10 will operate quietly and easily throughout the life thereof. The yoke 22 straddles the structure from above and has its cross-portion welded, as indicated at 25 in Fig. 1, to the web 13 at a plurality of points, while the arms 26 of the yoke reach downwardly on opposite sides of the channel 12 and project below the channel 12 far enough to permit a crosspin 27 mounted in the arms 26 to project below the web portion 14 of the channel 12, as clearly appears in Figs. 1 and 4. A wavy leaf spring 28 of approximately W longitudinal cross-section straddles the crosspin 27 and has its opposite end portions slidably engaging the web 14 in front and behind said pin. The spring 28 has to be flattened to the extent indicated in Fig. 1 in the assembling thereof on the pin 27 so that the two free end portions exert appreciable upward pressure against the web 14 of the channel 12, and accordingly urge the channel 11 downwardly under spring tension toward the front gear roller. The other yoke 23 has its cross-portion 29 riveted as at 30 to the web 14 and has the arms 31 thereof reaching upwardly to a point above the web portion 13 of the channel 11, as clearly appears in Figs. 1 and 5, so that another crosspin 27 and wavy spring 28, like the spring 28 previously mentioned, can be mounted on the yoke 23 slidably engaging the web 13 to urge the channel 11 downwardly under spring tension toward the rear gear roller. The light spring tension thus afforded in the vicinity of the two gear rollers urging the web portions 13 and 14 toward one another and into engagement with the gear rollers is enough to take up whatever play there would otherwise be so that there is no danger of rattling, and yet the springs 28 are light enough to give to whatever small extent may be necessary due to slight variations in the channels 11 and 12, so that there is no likelihood of heavy drag on the operation of the seat slide nor any tendency to bind or sieze.

The front end portion 32 of the channel 12 of each of the seat slide structures 9 and 10 is bent downwardly and forwardly to permit fastening thereof to the floor of the vehicle indicated at 33, as by means of a bolt 34 entered through the web 14. The channel 12 of each of the seat slide structures is, therefore, inclined downwardly toward the rear end portion 35, which is preferably bent slightly to rest flatly on the floor and permit fastening by means of a bolt 36 entered through the web 14. The channel 12 of each structure is, therefore, spaced from the floor throughout the major portion of its length so as to give the desired clearance with respect to battery boxes and whatever else may be located below the seat. The front and rear end portions 37 and 38 of the channel 11 of each of the seat slide structures 9 and 10 are bent upwardly to permit fastening of the forwardly bent front end portion to the bottom of the seat, indicated at 39, as by means of a bolt 40 entered through the web 13, the rearwardly bent end of the rear portion 38 being secured to the seat bottom by means of a bolt 41 also entered through the web 13. This construction, therefore, provides additional room between the floor and the bottom of the seat for general clearance purposes and to space the seat from the floor to whatever extent may be desired or necessary, as, for example, to permit free circulation of air under the seat where efficient rear seat heating depends upon it.

The front fastening bolt 40 also serves to secure a small sheet metal bracket 42 in place in the front end of the channel 11, which provides bearing support for a rod 43 for operating the latch 44 by means of which the seat slide is locked in adjusted position. The front end of the rod 43 is bent to provide a handle 45 adjacent the front portion of the seat, by means of which the latch 44 may be turned to unlock the seat slide to permit adjustment of the seat. A lug 46 is struck upwardly from the cross-portion 24 of the yoke 22 and provides bearing support for the rear end portion of the rod 43, the rod being extended through an opening 47 in the web of the upwardly bent front end portion 37 of the channel 11 for engagement in the lug 46, as clearly appears in Figs. 1 and 2. The rear end portion 48 of the rod 43 is made square to fit non-rotatably in a square hole 49 in the latch 44, the hole 50 in the lug 46, however, being circular and just large enough to circumscribe the square end 48 to provide bearing support therefor. 51 is a cotter pin entered through a hole in the projecting end portions 48 behind the lug 46 to hold the rod 43 against forward displacement, the rod being held against rearward displacement by engagement of the latch 44 with the opposite side of the lug 46. A coiled torsion spring 52 has its coiled portion mounted on the projecting end portion 48 of the rod 43 and has one end portion 53 bearing on top of the yoke 22 and its other end portion 54 bearing on top of the latch 44, so as to urge the latch normally toward locked position, the latch being turned by means of the handle 45 in the opposite direction against the action of the spring 52. The latch 44, as best appears in Fig. 4, has a tooth 55 projecting through a slot 56 in one arm 26 of the yoke 22 for engagement in any one of a series of longitudinally spaced notches 57 provided in the upper edge of the adjacent flange 21 of the channel 12. There is also a slot 58 in the adjacent flange 19 of the inner channel 11 registering with the slot 56 and receiving the extremity of the tooth 55 when the latch 44 is in locking engagement with any one of the notches 57, as shown in Fig. 4. In that way the tooth 55 has lateral support at points inwardly and outwardly spaced with relation to that portion engaged in the notch 57 and there is accordingly no danger of the tooth 55 being bent as a result of end thrust on the channel 11 in either direction relative to the channel 12. Furthermore the engagement of the tooth 55 into three registering openings 56, 57, and 58, as compared with engagement only in two openings, 56 and 57, tends to prevent deflection of the tooth 55 in a fore and aft direction under end thrust of one channel relative to the other and there is accordingly eliminated the play and consequent rattle which would otherwise be present, and the seat is moreover locked much more securely than would otherwise be the case. Release movement of the latch 44 is limited by engagement of the projecting opposite end portion 53 with the top of the yoke 22, as should be clear from inspection of Fig. 4, and in that way the spring 52 is protected against excessive loading. The lower edge 60 of the end portion 59 of the latch is cut away as indicated so as to permit enough movement between the latch 44 and the yoke 22 in the unlocking direction to insure disengagement of the tooth 55 from the notch 57 and the slot 58 while keeping the tooth engaged in the slot 56, so that there is no danger of the latch being accidentally lodged in an unlocked position.

Equal simultaneous movement of the channel 11 of both seat slide structures 9 and 10 is essential for easy to and fro adjustment of the seat, and for that reason a rack 61 is provided on the side of each of the channels 12 for engagement therein of gears 62 on the opposite ends of a crossshaft 63, the shaft 63 being supported at its ends in bearings 64 provided therefor in the flanges 19 of the channels 11. The ends 65 of the shaft are squared to fit in square holes 66 in the gears 62, but, of course, the bearings 64 are circular and rotatably receive the squared ends 65 of the shaft. Stamped sheet metal washers 67, which have square bearing portions 66 to fit rotatably on the squared ends 65 of the shaft, have rim portions 68 welded as at 69 to the peripheral portion of the gear 62 radially inwardly far enough in relation to the teeth of the gear so that the teeth have proper meshing engagement with the rack 61. The gears 62 with their washers 67 secured thereto are slipped onto the squared ends 65 of the shaft and require no retaining means, the fit being preferably tight enough to eliminate danger of the gears sliding off the ends of the shaft in shipment and prior to assembling on the seat slide structures on the car. The metal of the flanges 19 is swedged to provide the bearings 64 and the same is true in regard to the provision of the bearings 68 on the washers 67. The gears 62 although of stamped sheet metal construction work fairly smoothly on the racks 61 by reason of the good support provided therefor by the washers 67. The rack 61 is shown as secured at its rear end portion 70 to the bottom of the channel 12 by a rivet 71 entered through the web 14 of the channel, while the front end portion 72 is riveted as at 73 to the side of the channel 12.

Rearward movement of the seat is limited by the engagement of the yokes 22 on the channels 11 with the stop projections 74 struck outwardly from the flanges 21 of the channels 12. Forward movement on the other hand is limited by the engagement of the yokes 22 with the front end portions 72 of the racks 61, it being clear in Fig. 2 that the intermediate main portion of the length of the rack 61 is spaced from the seat slide structure so as to allow free movement of the yoke 22 therebetween and engagement of said yoke with the offset front end portion 72 at the forward limit of travel of the seat. While we have shown the outwardly struck stop projections 74, it will of course be apparent from inspection of Fig. 2 that the offset rear end portion 70 of the rack 61 may, if desired, be utilized as a stop for limiting rearward movement of the seat by engagement of the yoke 22 with it. In passing, attention is called to the transverse ribs 84 formed in the web 14 of the channel 12 adjacent the rear end thereof over which the lower edges of the flanges 19 on the channel 11 are freely movable under normal conditions in the rearward adjustment of the seat, but which are adapted to come into engagement with the edges of the flanges 19 in the event of excessive rearward pressure against the back of the seat tending to buckle the channel 12. The flanges 19 bottoming on the ribs 84 positively limit this undesired relative movement and avoid damage to the seat slides. A further means of bracing the channels is indicated at 85, where a sheet metal bracket secured by the rivet 71 to the bottom of the channel engages the floor and is arranged to be secured thereto as by a bolt 86.

The paralleling connection between the seat slide structures may take the form of that shown in Figs. 6 and 7, wherein 9a designates the left hand seat slide structure and 10a the right hand seat slide structure, 11a being the inner channel and 12a the outer channel of 9a, the parts otherwise corresponding to the structure previously described being numbered correspondingly. In this construction, the web 13 of the channel 11a has in addition to the rack holes 15 for the front and rear gear rollers an intermediate set of rack holes 61a for meshing engagement therein of a gear 62a mounted on the squared end 65 of a cross-shaft 63. The web 13 of the inner channel 11a, in other words, provides racks for not only the front and rear gear rollers 16—17 but also the parallel gears 62a. The gears 62a have washers 67 secured thereon, similarly as the gears 62 previously described, and are mounted on the squared ends 65 of the shaft 63 in a similar manner. The shaft in this construction, however, is supported near its opposite ends in bearings 64a provided on brackets 75 secured to the channels 12a as by rivets 76. With this construction it is obvious that at least one of the gears 62a on one end of the shaft 63 must be easily detachable and have an easy working fit on the squared end 65 of the shaft so as to permit entry of the shaft 63 through the bearings 64a on the two seat slide structures in the assembling of the paralleling means thereon.

The yokes 22a and 23a shown in Fig. 6 correspond generally to the yokes 22 and 23 of Fig. 1, and are U-shaped and secured by their cross-portions by rivets 77 to the web portion 14 of the channel 12a. The upper ends of the arms of the U-shaped yokes are bent laterally toward one another and are welded or otherwise suitably secured together so as to provide transverse walls 78 above and in substantially parallel relation to the web portion 13 of the other channel 11a, the walls 78 at the end of the assembling of each seat slide structure 9a and 10a being bent downwardly at the middle portion transversely with respect to the channel 11a for sliding engagement with the web 13. A peening hammer may be used in this operation, the walls 78 being hammered enough to secure the desired close working fit without on the other hand setting up any binding action or unnecessary drag on the operation of the structure.

A further alternative construction is disclosed in Fig. 8, wherein 22b and 23b are two yokes co-operating with channels 11b and 12b on two other seat slide structures 9b and 10b. These seat slide structures are interconnected by a cross-shaft 63 and gears 62a, similarly as in Fig. 6, for parallel operation of the channels 11b in the companion seat slide structures. The arms 26b and 31b of the two yokes extend upwardly to a point well above the web of the channel 11b and have slots 79 provided therein through which sheet metal keys 80 are entered, having curved edge portions 81 which before the bending of the keys by downward pressure or hammering on these edge portions in the final assembling operation are passable freely through the slots 79, but after such bending or hammering to deflect the same downwardly into frictional engagement with the web of the channel 11b are locked against endwise displacement from the slots 79, while serving to take up play between the channels 11b and 12b so that the channel 11b will operate smoothly and quietly in the channel 12b and there will be no likelihood of rattling. Here again care must be taken in bending or hammering the portions 81 to provide just enough engagement with the web portion of the channel 11b to secure the desired result, while avoiding too much frictional drag or any tendency toward binding. It will also be observed that the cross-portion 29b of the yoke 23b has a struck-up portion 82 arranged to enter a hole 83 in the web 14 of the channel 12b so that the yoke 23b while not riveted to the channel 12b is nevertheless held against endwise displacement with respect thereto. The same construction may be provided on the yoke 22b although both yokes may, if desired, be riveted in place similarly as the yokes 22a and 23a of Fig. 6.

It is believed the foregoing description conveys a good understanding of the objects and advantages of our invention. The appended claims have been drawn to cover all legitimate modifications and adaptations.

We claim:

1. In a structure for slidably adjustably supporting a seat with respect to the floor thereneath, the combination of interfitting upper inner and lower outer channel members disposed with their open sides toward one another so that the web portion of upper channel is uppermost and the web portion of the lower channel is lowermost one of said channels being secured by its web portion to the floor and the other of said channels being secured by its web portion to the seat, rollers disposed within said channels in longitudinally spaced relation with respect thereto having rolling engagement on the webs thereof on their diametrically opposite sides, a yoke member straddling the channels in the vicinity of one of the rollers having one end portion engaging the web portion of the upper channel and the other end portion disposed adjacent the web portion of the lower channel, means carried by the latter end of said yoke and slidably engaging the last named web portion resiliently to urge the same toward the adjacent roller, whereby to maintain close meshing engagement of said roller with the web portions of both channels, one or more stop projections on the flange of the lower channel for engagement with said yoke member to limit endwise movement of the upper channel, and means for releasably locking the channels in different positions of longitudinal adjustment of one relative to the other.

2. In a structure for slidably adjustably supporting a seat with respect to the floor thereneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, one of said channels having longitudinally spaced portions of the side flanges thereof struck from the planes thereof to provide flat-faced anti-friction bearing bosses of small diameter projecting toward and arranged slidably to engage the adjacent flanges of the other channel at longitudinally spaced points whereby to space the flanges of the channels substantially parallel relative to one another and prevent full length surface to surface engagement therebetween, and means for releasably locking the channels in different positions of longitudinal adjustment of one relative to the other.

3. In a structure for slidably adjustably supporting a seat with respect to the floor thereneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, rollers disposed within said channels in longitudinally spaced relation with respect thereto having rolling engagement on the webs thereof on their diametrically opposite sides, one or more yoke members straddling the channels, each having one end portion engaging the web portion of one of said channels and the other end portion disposed adjacent the web portion of the other channel, means carried by the latter end of said yoke and slidably engaging the last named web portion resiliently to urge the channels toward each other into close working relationship to said rollers, and means for releasably locking the channels in different positions of longitudinal adjustment of one relative to the other 4. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, yoke members straddling the channels at longitudinally spaced points thereof in the vicinity of the gear rollers with one end portion of each yoke engaging the web portion of one of said channels and with the other end portion of the yoke disposed adjacent the web portion of the other channel, means carried by the last-mentioned ends of said yokes and slidably engaging the web portion of the other channel resiliently to urge the same toward the gear roller whereby the web portions of the channels are urged resiliently toward opposite sides of the gear rollers, and means for releasably locking the channels in different positions of longitudinal adjustment of one relative to the other.

5. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, one or more U-shaped brackets straddling said interfitting channels with the cross-portion of each bracket held against endwise displacement on the web of one of said channels and with the arms of the bracket extending beyond the web of the other channel, a cross-pin supported on said arms in spaced relation to the web portion of said other channel, spring means carried on the cross-pin and slidably engaging the adjacent web portion whereby resiliently to urge the channels toward one another into close fitting relationship to the gear rollers, and means for releasably locking the channels in different positions of longitudinal adjustment of one relative to the other.

6. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, one or more U-shaped brackets straddling said interfitting channels with the cross-portion of each bracket held against endwise displacement on the web of one of said channels and with the arms of the bracket extending beyond the web of the other channel, the ends of said arms being interconnected by a wall extending transversely with respect to the adjacent web portion, the wall being bent inwardly into close frictional contact with said web portion whereby the channels are held with their web portions in close working relationship to the gear rollers, and means for releasably locking the channels in different positions of longitudinal adjustment of one relative to the other.

7. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, one or more U-shaped brackets straddling said interfitting channels with the cross-portion of each bracket held against endwise displacement on the web of one of said channels and with the arms of the bracket extending beyond the web of the other channel, a bendable sheet metal cross-piece rigidly supported at its opposite ends by said arms in transverse relation to the adjacent web portion and having a portion thereof bent inwardly into frictional engagement with said web portion whereby to hold the channels with their web portions in close working relation to the gear rollers, and means for releasably locking the channels in different positions of longitudinal adjustment of one relative to the other.

8. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, a bracket extending lengthwise relative to one side of the lower channel having a rack thereon, one of a pair of paralleling gears meshing with said rack, a shaft for interconnecting said gears carrying said gear and mounted in a bearing on the upper channel, the rack bracket being in spaced relation to the lower channel but secured by its end portions thereto, at least one of said end portions providing a stop, an inverted U-shaped bracket straddling the upper channel and secured thereto for movement therewith relative to the lower channel and arranged to engage the aforesaid stop to limit movement of the seat in one direction, a stop projection on at least one of the flanges of the lower channel for engagement with said bracket to limit movement of the seat in the opposite direction, and means for releasably locking the channels in different positions of longitudinal adjustment of one relative to the other.

9. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, an inverted U-shaped bracket mounted on and movable with the upper channel, a stop projection on at least one of the flanges of the lower channel arranged to engage said bracket to limit movement of the seat in that direction, and means for releasably locking the channels in different positions of longitudinal adjustment of one relative to the other.

10. A structure as set forth in claim 9, wherein the U-shaped bracket has means carried on the arms thereof below the lower channel and slidably engaging the latter to resiliently urge the upper channel downwardly, whereby said channels are held in close working relation to the gear rollers.

11. In a structure for slidably adjustably supporting a seat with respect to the floor therebeneath, the combination of interfitting upper inner and lower outer channel members disposed with their open sides toward one another so that the web portion of the upper channel is uppermost and the web portion of the lower channel is lowermost, the lower one of said channels being secured by its web portion to the floor and the upper one of said channels being secured by its web portion to the seat, rollers disposed within said channels in longitudinally spaced relation with respect thereto having rolling engagement on the webs thereof on their diametrically opposite sides, yieldable means for resiliently urging the channel members toward one another into close working relationship with the rollers disposed therebetween, the flanges of the upper channel being disposed with their lower edges in ample vertically spaced relation to the web of the lower channel, upward projections on the web portion of the lower channel at the rear end portion thereof providing one or more abutments normally in closely spaced relation to the lower edges of the flanges of the upper channel but adapted to be slidably engaged thereby upon downward displacement of the upper channel under stress, and means for releasably locking the channels in different positions of longitudinal adjustment of one relative to the other.

12. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, a yoke member straddling the channels in the vicinity of one of the gear rollers, having one end portion engaging the web portion of one of said channels and the other end portion disposed adjacent the web portion of the other channel, means carried by the latter end of said yoke and slidably engaging the last-named web portion resiliently to urge the same toward the adjacent gear roller, whereby to maintain close meshing engagement of said gear roller with the web portions of both channels, and means for releasably locking the channels in different positions of longitudinal adjustment of one relative to the other.

13. In a structure for slidably adjustably supporting a seat with respect to the floor therebeneath, the combination of interfitting inner and outer channel members disposed with their open sides toward one another so that the web portion of one channel is uppermost and the web portion of the other channel is lowermost, one of said channels being secured by its web portion to the floor and the other of said channels being secured by its web portion to the seat, gear rollers disposed within said channels in longitudinally spaced relation with respect thereto having rolling engagement on the webs thereof on their diametrically opposite sides, the webs of the channels having rack holes provided therein in longitudinally spaced relation for meshing engagement therein of the gear rollers, a bracket extending lengthwise relative to one side of the lower channel having a rack thereon, one of a pair of paralleling gears meshing with said rack, a shaft for interconnecting said gears carrying said gear and mounted in a bearing on the upper channel, the rack bracket being in spaced relation to the lower channel but secured by its end portions thereto, at least one of said end portions providing a stop, an inverted U-shaped bracket straddling the upper channel and secured thereto for movement therewith relative to the lower channel and arranged to engage the aforesaid stop to limit movement of the seat, and means for releasably locking the channels in different positions of longitudinal adjustment of one relative to the other.

14. A seat slide structure, comprising interfitting relatively movable slide members, the upper slide member being of channel cross-section with the web portion uppermost, and said upper slide member having an upwardly bent front end portion secured by the web thereof to the bottom of the seat to support the seat in elevated relation to the slide member, a manually rotatable rod extending lengthwise with respect to the front end portion of said upper slide member through an opening provided in the web of the bent-up front end portion, bearings in longitudinally spaced relation to said rod for supporting the same, one carried on the bottom of the bent-up front end portion of the upper slide and the other carried on the top of said slide member behind the bent-up front end portion, and a latch operable by said rod and arranged to engage detachably selectively in any one of a plurality of longitudinally spaced openings in a part rigid with the lower slide member.

15. A structure as set forth in claim 13, wherein the U-shaped bracket has means carried on the arms thereof below the lower channel and slidably engaging the latter to resiliently urge the upper channel downwardly, whereby said channels are held in close working relation to the gear rollers.

JAMES T. ATWOOD.
LYLE C. ATWOOD.